(12) United States Patent
Xiang et al.

(10) Patent No.: US 12,245,160 B2
(45) Date of Patent: Mar. 4, 2025

(54) POWER CONTROL METHOD AND POWER CONTROL APPARATUS

(71) Applicant: Huawei Technologies Co., Ltd., Shenzhen (CN)

(72) Inventors: Zhengzheng Xiang, Shanghai (CN); Jinfang Zhang, Shenzhen (CN); Wenting Guo, Shanghai (CN); Hongjia Su, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 540 days.

(21) Appl. No.: 17/401,790

(22) Filed: Aug. 13, 2021

(65) Prior Publication Data

US 2021/0410080 A1 Dec. 30, 2021

Related U.S. Application Data

(63) Continuation of application No. PCT/CN2020/074892, filed on Feb. 12, 2020.

(30) Foreign Application Priority Data

Feb. 15, 2019 (CN) .......................... 201910119337.7

(51) Int. Cl.
*H04W 52/24* (2009.01)
*H04L 5/00* (2006.01)
*H04W 4/40* (2018.01)

(52) U.S. Cl.
CPC ......... *H04W 52/242* (2013.01); *H04L 5/0048* (2013.01); *H04W 4/40* (2018.02)

(58) Field of Classification Search
CPC .................................................. H04W 52/242
See application file for complete search history.

(56) References Cited

U.S. PATENT DOCUMENTS

2013/0188502 A1* 7/2013 Yang .................... H04W 88/06
370/252
2013/0244715 A1 9/2013 Kwon et al.
(Continued)

FOREIGN PATENT DOCUMENTS

CN 102740434 A 10/2012
CN 104349437 2/2015
(Continued)

OTHER PUBLICATIONS

Samsung, "On Physical Layer Procedures for NR V2X," 3GPP TSG RAN WG1 Ad-Hoc Meeting 1901, R1-1901048, Jan. 21-25, 2019, Taipei, Taiwan, 11 pages.
(Continued)

*Primary Examiner* — Hsinchun Liao
(74) *Attorney, Agent, or Firm* — Slater Matsil, LLP

(57) ABSTRACT

This application provides a power control method and a power control apparatus. The method includes: sending, by a first terminal device, a first signal to a second terminal device at a first transmit power; receiving, by the first terminal device, first information from the second terminal device, where the first information is used to indicate or includes a first received power, and the first received power is a received power of the first signal; determining, by the first terminal device, an estimated value of a path loss between the first terminal device and the second terminal device based on the first transmit power and the first received power. According to this application, power control can be properly performed. This application may be applied to an internet of vehicles, for example, V2X, LTE-V, and V2V, or may be applied to fields such as D2D, intelligent driving, and intelligent connected vehicles.

14 Claims, 7 Drawing Sheets

(56) References Cited

U.S. PATENT DOCUMENTS

| | | | |
|---|---|---|---|
| 2014/0086193 A1* | 3/2014 | Suzuki | H04W 74/006 |
| | | | 370/329 |
| 2014/0226578 A1 | 8/2014 | Zhu et al. | |
| 2015/0078279 A1 | 3/2015 | Ko et al. | |
| 2017/0188402 A1* | 6/2017 | Park | H04W 24/08 |
| 2017/0208448 A1* | 7/2017 | Zhu | H04W 8/005 |
| 2018/0352404 A1 | 12/2018 | Yi et al. | |

FOREIGN PATENT DOCUMENTS

| | | |
|---|---|---|
| CN | 105722200 | 6/2016 |
| CN | 108632973 | 10/2018 |
| CN | 109075955 | 12/2018 |
| CN | 109257810 | 1/2019 |
| CN | 110381574 | 10/2019 |
| JP | 2016082331 A | 5/2016 |
| WO | 2015059834 A1 | 4/2015 |
| WO | 2015198428 A1 | 12/2015 |

OTHER PUBLICATIONS

3GPP TS 38.211 V15.4.0 (Dec. 2018), 3rd Generation Partnership Project; Technical Specification Group Radio Access Network; NR; Physical channels and modulation (Release 15), 96 pages.

3GPP TS 38.213 V15.4.0 (Dec. 2018) "3rd Generation Partnership Project; Technical Specification Group Radio Access Network; NR; Physical layer procedures for control (Release 15)", 104 pages.

3GPP TSG RAN WG1 Meeting #95, R1-1812307, "Physical layer procedure for NR sidelink," Spokane, USA, Nov. 12-16, 2018, 7 pages.

3GPP TSG RAN WG1 Meeting #95, R1-1812985, "Discussion on Physical Layer Procedures," Samsung, Spokane, USA, Nov. 12-16, 2018, 6 pages.

* cited by examiner

POWER CONTROL METHOD AND POWER CONTROL APPARATUS

CROSS-REFERENCE TO RELATED APPLICATIONS

This application is a continuation of International Application No. PCT/CN2020/074892, filed on Feb. 12, 2020, which claims priority to Chinese Patent Application No. 201910119337.7, filed on Feb. 15, 2019. The disclosures of the aforementioned applications are hereby incorporated by reference in their entireties.

TECHNICAL FIELD

This application relates to the field of communication technologies, and in particular, to a power control method and a power control apparatus.

BACKGROUND

In a network adopting a long term evolution (LTE) technology proposed by the 3rd generation partnership project (3GPP), an internet of vehicles technology for vehicle-to-everything (V2X) communication is proposed. V2X communication is communication between a vehicle and anything outside the vehicle, and includes vehicle-to-vehicle (V2V) communication, vehicle-to-pedestrian (V2P) communication, vehicle-to-infrastructure (V2I) communication, and vehicle-to-network (V2N) communication.

Through direct communication between vehicles, a vehicle can obtain status information and road conditions of other vehicles in real time, so that vehicle driving can be better assisted.

A service type in LTE-V2X is mainly broadcast. However, a service type in NR-V2X may further be unicast, a groupcast message, or the like. Therefore, how to perform power control in the NR-V2X needs to be urgently resolved.

SUMMARY

This application provides a power control method and a power control apparatus, to properly implement power control.

According to a first aspect, an embodiment of this application provides a power control method. The method includes: A first terminal device sends a first signal to a second terminal device at a first transmit power; the first terminal device receives first information from the second terminal device, where the first information is used to indicate or includes a first received power, and the first received power is a received power of the first signal; the first terminal device determines an estimated value of a path loss between the first terminal device and the second terminal device based on the first transmit power and the first received power.

In this embodiment of this application, the first terminal device obtains, based on the first information sent by the second terminal device, the received power of the first signal received by the second terminal device. Therefore, the first terminal device may determine the estimated value of the path loss between the first terminal device and the second terminal device based on the transmit power and the received power of the first signal, so that the first terminal device can accurately obtain the estimated value of the path loss between the first terminal device and the second terminal device, thereby improving accuracy of power control performed by the first terminal device.

With reference to the first aspect, in a possible implementation, after that the first terminal device determines an estimated value of a path loss between the first terminal device and the second terminal device based on the first transmit power and the first received power, the method further includes: The first terminal device determines a second transmit power based on the estimated value of the path loss between the first terminal device and the second terminal device, where the second transmit power is a transmit power of a second signal; the first terminal device sends the second signal to the second terminal device at the second transmit power.

In this embodiment of this application, the first terminal device determines the transmit power of the second signal based on the estimated value of the path loss between the first terminal device and the second terminal device. In this way, inaccurate transmit power control or reduced performance caused because a transmit power is determined based on an estimated value of a path loss between the first terminal device and a network device is avoided in more V2X scenarios. Therefore, this embodiment of this application can be applied to more scenarios, and the accuracy of power control is improved.

With reference to any one of the first aspect or the possible implementations of the first aspect, the second transmit power satisfies the following formula:

$$P_1 = \min\{P_{CMAX}, f(M) + P_O + \alpha \times PL_1\}$$

where $P_1$ is the second transmit power, $P_{CMAX}$ is a maximum transmit power, $f(M)$ is a function of a bandwidth of the second signal, $P_O$ is a target received power of the second terminal device, and $PL_1$ is the estimated value of the path loss between the first terminal device and the second terminal device With reference to any one of the first aspect or the possible implementations of the first aspect, the second transmit power satisfies the following formula:

$$P_1 = \min\{P_{CMAX}, f(M) + P_O + \alpha \times PL_1 + f\}$$

where $P_1$ is the second transmit power, $P_{CMAX}$ is a maximum transmit power, $f(M)$ is a function of a bandwidth of the second signal, $P_O$ is a target received power of the second terminal device, $PL_1$ is the estimated value of the path loss between the first terminal device and the second terminal device, and f is an adjustment parameter.

With reference to any one of the first aspect or the possible implementations of the first aspect, after that the first terminal device determines an estimated value of a path loss between the first terminal device and the second terminal device based on the first transmit power and the first received power, the method further includes: The first terminal device determines a second transmit power based on the estimated value of the path loss between the first terminal device and the second terminal device and an estimated value of a path loss between the first terminal device and a network device, where the second transmit power is a transmit power of a second signal; the first terminal device sends the second signal to the second terminal device at the second transmit power.

With reference to any one of the first aspect or the possible implementations of the first aspect, the second transmit power satisfies the following formula:

$$P_1 = \min\{P_{CMAX}, f(M) + P_O + \alpha \times \min(PL_1, PL_2)\}$$

where $P_1$ is the second transmit power, $P_{CMAX}$ is a maximum transmit power, $f(M)$ is a function of a bandwidth of the second signal, $P_O$ is a target received power of the second terminal device, $PL_1$ is the estimated value of the path loss between the first terminal device and the second terminal device, and $PL_2$ is the estimated value of the path loss between the first terminal device and the network device.

With reference to any one of the first aspect or the possible implementations of the first aspect, the second transmit power satisfies the following formula:

$$P_1=\min\{P_{CMAX}, f(M)+P_O+\alpha\times\min(PL_1,PL_2)+f\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

With reference to any one of the first aspect or the possible implementations of the first aspect, the first signal includes one or both of a channel state information reference signal (CSI RS) and a synchronization signal block.

In this embodiment of this application, the CSI RS may be further understood as a CSI RS on a sidelink (sidelink), and the synchronization signal block may be further understood as an SL synchronization signal block.

According to a second aspect, an embodiment of this application provides a power control method. The method includes: A second terminal device receives a first signal from a first terminal device; the second terminal device sends first information to the first terminal device, where the first information is used to indicate or includes a first received power, and the first received power is a received power of the first signal.

In this embodiment of this application, the second terminal device sends the first information to the first terminal device, so that the first terminal device may determine an estimated value of a path loss between the first terminal device and the second terminal device based on the first information. Therefore, the first terminal device can properly control a transmit power of a signal.

With reference to the second aspect, in a possible implementation, the first signal includes one or both of a channel state information reference signal CSI RS and a synchronization signal block.

According to a third aspect, an embodiment of this application further provides a power control method. The method includes: A first terminal device sends second information to a second terminal device, where the second information is used to indicate or includes a third transmit power; the first terminal device receives a third signal sent by the second terminal device at the third transmit power; the first terminal device determines an estimated value of a path loss between the first terminal device and the second terminal device based on a third received power and the third transmit power, where the third received power is a received power of the third signal.

With reference to the third aspect, in a possible implementation, after that the first terminal device determines an estimated value of a path loss between the first terminal device and the second terminal device based on a third received power and the third transmit power, the method further includes: The first terminal device determines a fourth transmit power based on the estimated value of the path loss between the first terminal device and the second terminal device, where the fourth transmit power is a transmit power of a fourth signal; the first terminal device sends the fourth signal to the second terminal device at the fourth transmit power.

With reference to any one of the third aspect or the possible implementations of the third aspect, the fourth transmit power satisfies the following formula:

$$P_2=\min\{P_{CMAX}, f(N)+P_O+\alpha\times PL_1\}$$

where $P_2$ is the fourth transmit power, $P_{CMAX}$ is a maximum transmit power, f(N) is a function of a bandwidth of the fourth signal, $P_O$ is a target received power of the second terminal device, and $PL_1$ is the estimated value of the path loss between the first terminal device and the second terminal device.

With reference to any one of the third aspect or the possible implementations of the third aspect, the fourth transmit power satisfies the following formula:

$$P_2=\min\{P_{CMAX}, f(N)+P_O+\alpha\times PL_1+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and f is an adjustment parameter.

With reference to any one of the third aspect or the possible implementations of the third aspect, after that the first terminal device determines an estimated value of a path loss between the first terminal device and the second terminal device based on a third received power and the third transmit power, the method further includes: The first terminal device determines a fourth transmit power based on the estimated value of the path loss between the first terminal device and the second terminal device and an estimated value of a path loss between the first terminal device and a network device, where the fourth transmit power is a transmit power of a fourth signal; the first terminal device sends the fourth signal to the second terminal device at the fourth transmit power.

With reference to any one of the third aspect or the possible implementations of the third aspect, the fourth transmit power satisfies the following formula:

$$P_2=\min\{P_{CMAX}, f(N)+P_O+\alpha\times\min(PL_1,PL_2)+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and $PL_2$ is the estimated value of the path loss between the first terminal device and the network device.

With reference to any one of the third aspect or the possible implementations of the third aspect, the fourth transmit power satisfies the following formula:

$$P_2=\min\{P_{CMAX}, f(N)+P_O+\alpha\times\min(PL_1,PL_2)+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

With reference to any one of the third aspect or the possible implementations of the third aspect, the third signal includes one or both of a channel state information reference signal CSI RS and a synchronization signal block.

According to a fourth aspect, an embodiment of this application provides a power control method. The method includes: A second terminal device receives second information from a first terminal device, where the second information is used to indicate or includes a third transmit power; the second terminal device sends a third signal to the first terminal device at the third transmit power.

With reference to the fourth aspect, in a possible implementation, the third signal includes one or both of a channel state information reference signal CSI RS and a synchronization signal block.

According to a fifth aspect, an embodiment of this application provides a power control apparatus. The apparatus includes: a sending unit, configured to send a first signal to a second terminal device at a first transmit power; a receiving unit, configured to receive first information from the second terminal device, where the first information is used to indicate or includes a first received power, and the first received power is a received power of the first signal; a processing unit, configured to determine an estimated value of a path loss between the first terminal device and the second terminal device based on the first transmit power and the first received power.

With reference to the fifth aspect, in a possible implementation, the processing unit is further configured to determine a second transmit power based on the estimated value of the path loss between the first terminal device and the second terminal device, where the second transmit power is a transmit power of a second signal. The sending unit is further configured to send the second signal to the second terminal device at the second transmit power.

With reference to any one of the fifth aspect or the possible implementations of the fifth aspect, the second transmit power satisfies the following formula:

$$P_1 = \min\{P_{CMAX}, f(M) + P_O + \alpha \times PL_1\}$$

where $P_1$ is the second transmit power, $P_{CMAX}$ is a maximum transmit power, $f(M)$ is a function of a bandwidth of the second signal, $P_O$ is a target received power of the second terminal device, and $PL_1$ is the estimated value of the path loss between the first terminal device and the second terminal device.

With reference to any one of the fifth aspect or the possible implementations of the fifth aspect, the second transmit power satisfies the following formula:

$$P_1 = \min\{P_{CMAX}, f(M) + P_O + \alpha \times PL_1 + f\}$$

where $P_1$ is the second transmit power, $P_{CMAX}$ is a maximum transmit power, $f(M)$ is a function of a bandwidth of the second signal, $P_O$ is a target received power of the second terminal device, $PL_1$ is the estimated value of the path loss between the first terminal device and the second terminal device, and f is an adjustment parameter.

With reference to any one of the fifth aspect or the possible implementations of the fifth aspect, the processing unit is further configured to determine a second transmit power based on the estimated value of the path loss between the first terminal device and the second terminal device and an estimated value of a path loss between the first terminal device and a network device, where the second transmit power is a transmit power of a second signal. The sending unit is further configured to send the second signal to the second terminal device at the second transmit power.

With reference to any one of the fifth aspect or the possible implementations of the fifth aspect, the second transmit power satisfies the following formula:

$$P_1 = \min\{P_{CMAX}, f(M) + P_O + \alpha \times \min(PL_1, PL_2)\}$$

where $P_1$ is the second transmit power, $P_{CMAX}$ is a maximum transmit power, $f(M)$ is a function of a bandwidth of the second signal, $P_O$ is a target received power of the second terminal device, $PL_1$ is the estimated value of the path loss between the first terminal device and the second terminal device, and $PL_2$ is the estimated value of the path loss between the first terminal device and the network device.

With reference to any one of the fifth aspect or the possible implementations of the fifth aspect, the second transmit power satisfies the following formula:

$$P_1 = \min\{P_{CMAX}, f(M) + P_O + \alpha \times \min(PL_1, PL_2) + f\}$$

where $P_1$ is the second transmit power, $P_{CMAX}$ is a maximum transmit power, $f(M)$ is a function of a bandwidth of the second signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

With reference to any one of the fifth aspect or the possible implementations of the fifth aspect, the first signal includes one or both of a channel state information reference signal CSI RS and a synchronization signal block.

According to a sixth aspect, an embodiment of this application provides a power control apparatus. The apparatus includes: a receiving unit, configured to receive a first signal from a first terminal device; a sending unit, configured to send first information to the first terminal device, where the first information is used to indicate or includes a first received power, and the first received power is a received power of the first signal.

With reference to the sixth aspect, in a possible implementation, the first signal includes one or both of a channel state information reference signal CSI RS and a synchronization signal block.

According to a seventh aspect, an embodiment of this application further provides a power control apparatus. The apparatus includes: a sending unit, configured to send second information to a second terminal device, where the second information is used to indicate or includes a third transmit power; a receiving unit, configured to receive a third signal sent by the second terminal device at the third transmit power; a processing unit, configured to determine an estimated value of a path loss between the first terminal device and the second terminal device based on a third received power and the third transmit power, where the third received power is a received power of the third signal.

With reference to the seventh aspect, in a possible implementation, the processing unit is further configured to determine a fourth transmit power based on the estimated value of the path loss between the first terminal device and the second terminal device, where the fourth transmit power is a transmit power of a fourth signal. The sending unit is further configured to send the fourth signal to the second terminal device at the fourth transmit power.

With reference to any one of the seventh aspect or the possible implementations of the seventh aspect, the fourth transmit power satisfies the following formula:

$$P_2 = \min\{P_{CMAX}, f(N) + P_O + \alpha \times PL_1\}$$

where $P_2$ is the fourth transmit power, $P_{CMAX}$ is a maximum transmit power, $f(N)$ is a function of a bandwidth of the fourth signal, $P_O$ is a target received power of the second terminal device, and $PL_1$ is the estimated value of the path loss between the first terminal device and the second terminal device.

With reference to any one of the seventh aspect or the possible implementations of the seventh aspect, the fourth transmit power satisfies the following formula:

$$P_2=\min\{P_{CMAX}, f(N)+P_O+\alpha \times PL_1+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and f is an adjustment parameter.

With reference to any one of the seventh aspect or the possible implementations of the seventh aspect, the processing unit is further configured to determine a fourth transmit power based on the estimated value of the path loss between the first terminal device and the second terminal device and an estimated value of a path loss between the first terminal device and a network device, where the fourth transmit power is a transmit power of a fourth signal. The sending unit is further configured to send the fourth signal to the second terminal device at the fourth transmit power.

With reference to any one of the seventh aspect or the possible implementations of the seventh aspect, the fourth transmit power satisfies the following formula:

$$P_2=\min\{P_{CMAX}, f(N)+P_O+\alpha \times \min(PL_1,PL_2)\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and $PL_2$ is the estimated value of the path loss between the first terminal device and the network device.

With reference to any one of the seventh aspect or the possible implementations of the seventh aspect, the fourth transmit power satisfies the following formula:

$$P_2=\min\{P_{CMAX}, f(N)+P_O+\alpha \times \min(PL_1,PL_2)+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

With reference to any one of the seventh aspect or the possible implementations of the seventh aspect, the third signal includes one or both of a channel state information reference signal CSI RS and a synchronization signal block.

According to an eighth aspect, an embodiment of this application further provides a power control apparatus. The apparatus includes: a receiving unit, configured to receive second information from a first terminal device, where the second information is used to indicate or includes a third transmit power; a sending unit, configured to send a third signal to the first terminal device at the third transmit power.

With reference to the eighth aspect, in a possible implementation, the third signal includes one or both of a channel state information reference signal CSI RS and a synchronization signal block.

According to a ninth aspect, an embodiment of this application provides a terminal device, where the terminal device is used as a first terminal device. The first terminal device includes a processor, a memory, and a transceiver. The processor is coupled to the memory, and the processor is coupled to the transceiver. The transceiver is configured to send a first signal to a second terminal device at a first transmit power; receive first information from the second terminal device, where the first information is used to indicate or includes a first received power, and the first received power is a received power of the first signal. The processor is configured to run instructions or a program in the memory, and the processor is configured to determine an estimated value of a path loss between the first terminal device and the second terminal device based on the first transmit power and the first received power.

With reference to the ninth aspect, in a possible implementation, the processor is further configured to determine a second transmit power based on the estimated value of the path loss between the first terminal device and the second terminal device, where the second transmit power is a transmit power of a second signal. The transceiver is further configured to send the second signal to the second terminal device at the second transmit power.

With reference to any one of the ninth aspect or the possible implementations of the ninth aspect, the second transmit power satisfies the following formula:

$$P_1=\min\{P_{CMAX}, f(M)+P_O+\alpha \times PL_1\}$$

where $P_1$ is the second transmit power, $P_{CMAX}$ is a maximum transmit power, f(M) is a function of a bandwidth of the second signal, $P_O$ is a target received power of the second terminal device, and $PL_1$ is the estimated value of the path loss between the first terminal device and the second terminal device.

With reference to any one of the ninth aspect or the possible implementations of the ninth aspect, the second transmit power satisfies the following formula:

$$P_1=\min\{P_{CMAX}, f(M)+P_0+\alpha \times PL_1+f\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, and f is an adjustment parameter.

With reference to any one of the ninth aspect or the possible implementations of the ninth aspect, the processor is further configured to determine a second transmit power based on the estimated value of the path loss between the first terminal device and the second terminal device and an estimated value of a path loss between the first terminal device and a network device, where the second transmit power is a transmit power of a second signal. The transceiver is further configured to send the second signal to the second terminal device at the second transmit power.

With reference to any one of the ninth aspect or the possible implementations of the ninth aspect, the second transmit power satisfies the following formula:

$$P_1=\min\{P_{CMAX}, f(M)+P_O+\alpha \times \min(PL_1,PL_2)\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, and $PL_2$ is the estimated value of the path loss between the first terminal device and the network device.

With reference to any one of the ninth aspect or the possible implementations of the ninth aspect, the second transmit power satisfies the following formula:

$$P_1=\min\{P_{CMAX}, f(M)+P_O+\alpha \times \min(PL_1,PL_2)+f\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

With reference to any one of the ninth aspect or the possible implementations of the ninth aspect, the first signal includes one or both of a channel state information reference signal CSI RS and a synchronization signal block.

According to a tenth aspect, an embodiment of this application provides a terminal device, where the terminal device is used as a second terminal device. The second terminal device includes a processor, a memory, and a transceiver. The processor is coupled to the memory, and the processor is coupled to the transceiver. The transceiver is configured to receive a first signal from a first terminal device; send first information to the first terminal device, where the first information is used to indicate or includes a first received power, and the first received power is a received power of the first signal.

With reference to the tenth aspect, in a possible implementation, the first signal includes one or both of a channel state information reference signal CSI RS and a synchronization signal block.

According to an eleventh aspect, an embodiment of this application provides a terminal device, where the terminal device is used as a first terminal device. The first terminal device includes a processor, a memory, and a transceiver. The processor is coupled to the memory, and the processor is coupled to the transceiver. The transceiver is configured to send second information to a second terminal device, where the second information is used to indicate or includes a third transmit power; receive a third signal sent by the second terminal device at the third transmit power. The processor is configured to run instructions or a program in the memory, and the processor is configured to determine an estimated value of a path loss between the first terminal device and the second terminal device based on a third received power and the third transmit power, where the third received power is a received power of the third signal.

With reference to the eleventh aspect, in a possible implementation, the processor is further configured to determine a fourth transmit power based on the estimated value of the path loss between the first terminal device and the second terminal device, where the fourth transmit power is a transmit power of a fourth signal. The transceiver is further configured to send the fourth signal to the second terminal device at the fourth transmit power.

With reference to any one of the eleventh aspect or the possible implementations of the eleventh aspect, the fourth transmit power satisfies the following formula:

$$P_2=\min\{P_{CMAX}, f(N)+P_O+\alpha \times PL_1\}$$

where $P_2$ is the fourth transmit power, $P_{CMAX}$ is a maximum transmit power, f(N) is a function of a bandwidth of the fourth signal, $P_O$ is a target received power of the second terminal device, and $PL_1$ is the estimated value of the path loss between the first terminal device and the second terminal device.

With reference to any one of the eleventh aspect or the possible implementations of the eleventh aspect, the fourth transmit power satisfies the following formula:

$$P_2=\min\{P_{CMAX}, f(N)+P_O+\alpha \times PL_1+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and f is an adjustment parameter.

With reference to any one of the eleventh aspect or the possible implementations of the eleventh aspect, the processor is further configured to determine a fourth transmit power based on the estimated value of the path loss between the first terminal device and the second terminal device and an estimated value of a path loss between the first terminal device and a network device, where the fourth transmit power is a transmit power of a fourth signal. The transceiver is further configured to send the fourth signal to the second terminal device at the fourth transmit power.

With reference to any one of the eleventh aspect or the possible implementations of the eleventh aspect, the fourth transmit power satisfies the following formula:

$$P_2=\min\{P_{CMAX}, f(N)+P_O+\alpha \times \min(PL_1,PL_2)\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and $PL_2$ is the estimated value of the path loss between the first terminal device and the network device.

With reference to any one of the eleventh aspect or the possible implementations of the eleventh aspect, the fourth transmit power satisfies the following formula:

$$P_2=\min\{P_{CMAX}, f(N)+P_O+\alpha \times \min(PL_1,PL_2)+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

With reference to any one of the eleventh aspect or the possible implementations of the eleventh aspect, the third signal includes one or both of a channel state information reference signal CSI RS and a synchronization signal block.

According to a twelfth aspect, an embodiment of this application provides a terminal device, where the terminal device is used as a second terminal device. The second terminal device includes a processor, a memory, and a transceiver. The processor is coupled to the memory, and the processor is coupled to the transceiver. The transceiver is configured to receive second information from a first terminal device, where the second information is used to indicate or includes a third transmit power; send a third signal to the first terminal device at the third transmit power.

With reference to the twelfth aspect, in a possible implementation, the third signal includes one or both of a channel state information reference signal CSI RS and a synchronization signal block.

According to a thirteenth aspect, an embodiment of this application provides a computer-readable storage medium. The computer-readable storage medium stores instructions.

When the instructions are run on a computer, the computer is enabled to perform the method according to any one of the foregoing aspects.

According to a fourteenth aspect, an embodiment of this application provides a computer program product including instructions. When the computer program product runs on a computer, the computer is enabled to perform the method according to any one of the foregoing aspects.

DETAILED DESCRIPTION OF ILLUSTRATIVE EMBODIMENTS

The following describes the embodiments of this application with reference to the accompanying drawings in the embodiments of this application.

In the specification, claims, and accompanying drawings of this application, terms "first", "second", and the like are intended to distinguish different objects but do not indicate a particular order. In addition, terms "including", "having", and any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that in this application, "at least one (item)" means one or more, "a plurality of" means two or more, and "at least two (items)" means two, three or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

The following specifically describes a scenario in the embodiments of this application.

Figure 1:
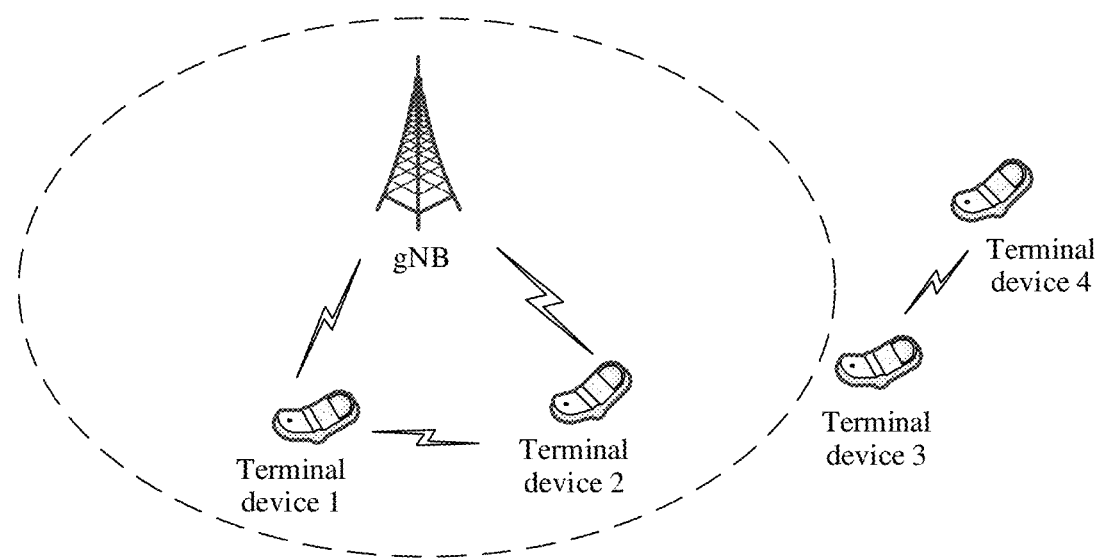
FIG. 1 is a schematic diagram of a communication system according to an embodiment of this application.

A communication system used in this application may be understood as a wireless cellular communication system, or may be understood as a wireless communication system based on a cellular network architecture, for example, a 5th generation (5G) mobile communication system and a next generation mobile communication system. FIG. 1 is a schematic diagram of a communication system according to an embodiment of this application. The solutions in this application are applicable to the communication system. The communication system may include at least one network device, and only one network device is shown, for example, a next generation NodeB (gNB) in the figure. The communication system may further include one or more terminal devices connected to the network device, for example, a terminal device 1 and a terminal device 2 in the figure.

The network device may be a device that can communicate with the terminal device. The network device may be any device having a wireless transceiver function, and includes but is not limited to a base station. For example, the base station may be a gNB, or the base station may be a base station in a future communication system. Optionally, the network device may alternatively be an access node, a wireless relay node, a wireless backhaul node, or the like in a wireless local area network system. Optionally, the network device may alternatively be a radio controller in a cloud radio access network (CRAN) scenario. Optionally, the network device may alternatively be a wearable device, a vehicle-mounted device, or the like. Optionally, the network device may alternatively be a small cell, a transmission reception point (TRP), a road side unit, or the like. Certainly, this application is not limited thereto.

The terminal device may also be referred to as user equipment (UE), a terminal, or the like. The terminal device is a device having a wireless transceiver function. The terminal device may be deployed on land, and includes an indoor device, an outdoor device, a handheld device, a wearable device, or a vehicle-mounted device; or may be deployed on a water surface, for example, on a ship; or may be deployed in the air, for example, on an airplane, a balloon, or a satellite. The terminal device may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine (also called as remote medical), a wireless terminal in a smart grid, a wireless terminal in transportation safety, a wireless terminal in a smart city, a wireless terminal in a smart home, or the like.

It may be understood that, in the communication system shown in FIG. 1, communication between the terminal device 1 and the terminal device 2 may be performed by using a device-to-device (D2D) technology or a vehicle-to-everything (V2X) communication technology. It may be understood that, in the communication system shown in FIG. 1, communication between a terminal device 3 and a terminal device 4 may be performed by using the device-to-device (D2D) technology or the vehicle-to-everything (V2X) communication technology. It may be understood that the communication system shown in this embodiment of this application may be further applied to V2X communication in more scenarios. For example, whether a terminal device in V2X communication is within a coverage area of a base station is not limited in this embodiment of this application.

Figure 2:
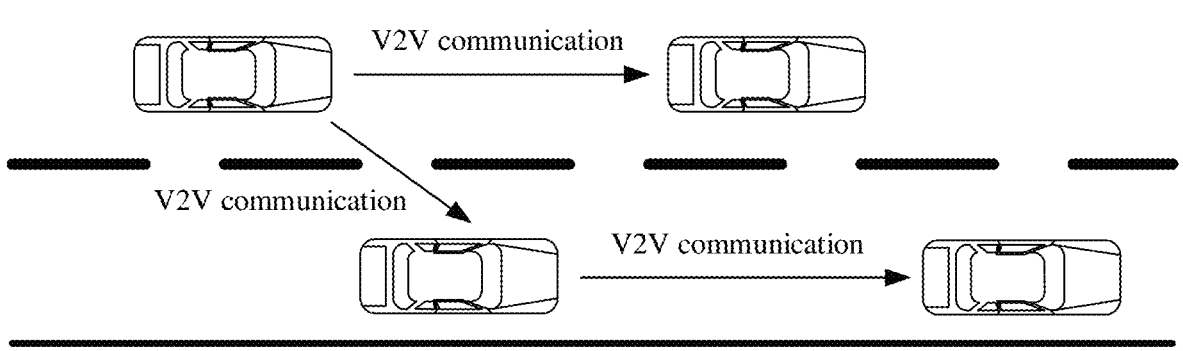
FIG. 2 is a schematic diagram of a V2V communication scenario according to an embodiment of this application.

For example, FIG. 2 is a schematic diagram of a V2V communication scenario according to an embodiment of this application. As shown in FIG. 2, in a driving process, a vehicle may directly exchange information with another nearby vehicle through V2V communication.

An LTE V2V communication system generally has two communication modes. A first communication mode is V2V communication based on scheduling performed by a base station, and a V2V user sends control information and data for V2V communication on a scheduled time-frequency resource based on scheduling information of the base station. In a second communication mode, a V2V user selects a time-frequency resource used for communication from available time-frequency resources included in a V2V communication resource pool, and sends control information and data on the selected time-frequency resource.

Figure 3:
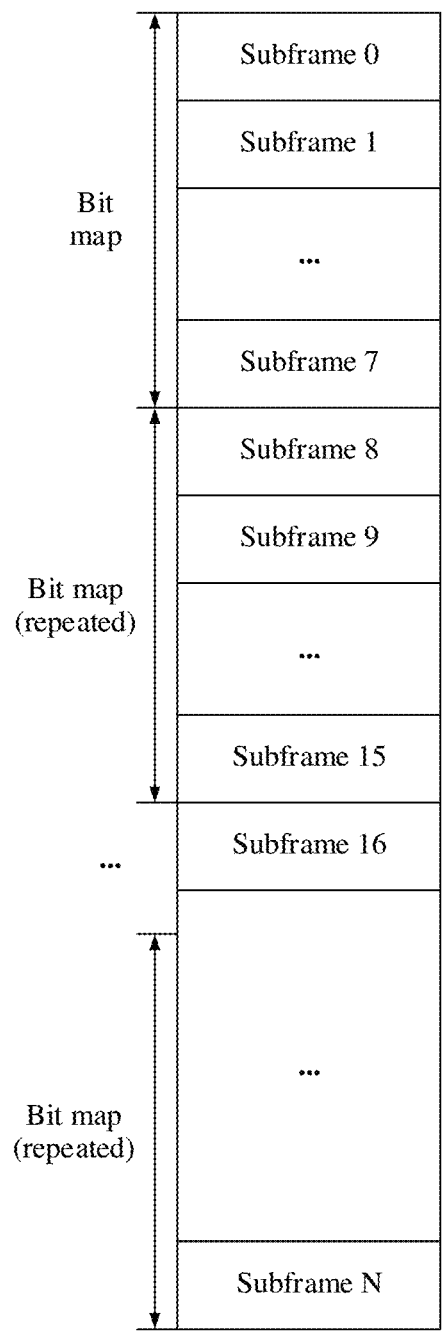
FIG. 3 is a schematic diagram of a structure of a bit map according to an embodiment of this application.
Figure 4:
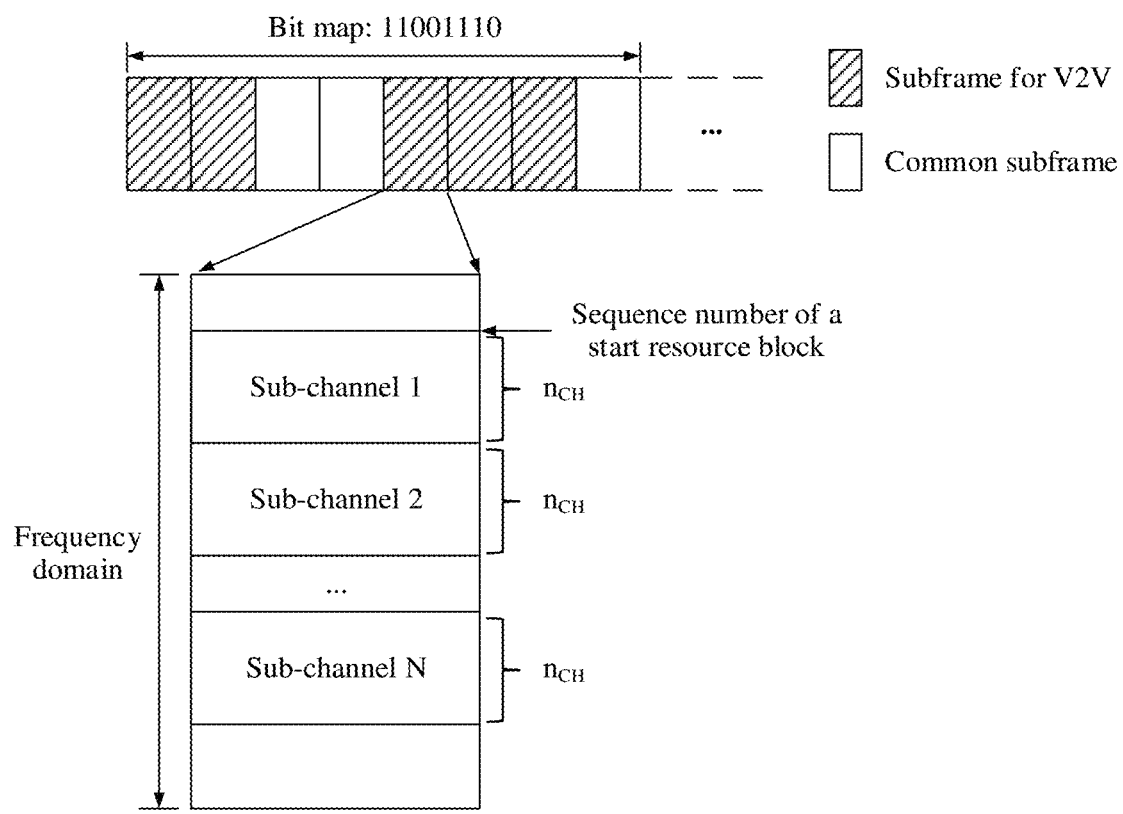
FIG. 4 is a schematic diagram of a frequency domain resource according to an embodiment of this application.

The time-frequency resource for V2V communication is configured based on the V2V communication resource pool. The V2V communication resource pool may be considered as a set including a time resource and a frequency resource used for V2V communication. Specifically, for a time resource, a base station uses one bit map and periodically repeats the bit map to indicate a set of subframes that are in all subframes in a system and that are used for V2V communication. FIG. 3 is a schematic diagram of a bit map according to an embodiment of this application. It may be understood that a length of the bit map shown in FIG. 3 is 8 bits. For a frequency resource in the V2V communication resource pool, a base station divides a frequency band used for V2V communication into several sub-channels, and each sub-channel includes a particular quantity of resource blocks. FIG. 4 is a schematic diagram of a frequency domain resource according to an embodiment of this application. A base station may indicate a sequence number of the first resource block (resource block, RB) of a frequency resource used for V2V communication, a total quantity N of sub-channels included in a communication resource pool, and a quantity $n_{CH}$ of resource blocks included in each sub-channel.

It may be understood that the foregoing is merely an example of the time-frequency resource used for V2X transmission provided in the embodiments of this application. In a specific implementation, the time-frequency resource used for V2X transmission may be further in another manner, of another structure, or the like. This is not limited in the embodiments of this application.

In an LTE communication system or an NR communication system, the base station may control an uplink power of a terminal device. A core idea of uplink power control is that, based on a path loss of the terminal device, average powers of uplink signals sent by terminal devices at different distances from the base station are approximately the same. For example, if the terminal device is relatively close to the base station, a transmit power of the terminal device is relatively small. If the terminal device is far from the base station, a transmit power of the terminal device is relatively large. For example, a formula for uplink power control of the terminal device may satisfy the following formula:

$$P_{PUSCH}=\min\{P_{CMAX}, P_O+\alpha \times PL+10 \cdot \log_{10}(2^\mu \times M_{RB})+ \Delta_{TF}+\delta\} \quad (1)$$

where $P_{PUSCH}$ is a transmit power of a physical uplink shared channel (physical uplink shared channel, PUSCH), $P_{CMAX}$ is a maximum transmit power of the terminal device, $P_O$ is a target received power that is of the base station and that is configured by a network side, a is a path loss adjustment factor, PL is a path loss between the terminal device and the base station, $M_{RB}$ is a quantity of RBs occupied by the UE, $\Delta_{TF}$ is a parameter related to a modulation and coding scheme (modulation and coding scheme, MCS) of uplink data sent by the terminal device, and $\delta$ is a closed-loop-based power control parameter.

For the formula (1), PL is generally obtained after the terminal device measures a received power of a downlink reference signal delivered by the base station. For example, PL may satisfy the following formula:

$$PL=\text{referenceSignalPower}-RSRP_f \quad (2)$$

where referenceSignalPower is a reference signal transmit power, and a value may be configured by the base station and by using higher layer signaling, that is, a transmit power of a downlink reference signal is indicated by using the higher layer signaling; $RSRP_f$ is a reference signal received power (reference signal received power, RSRP) obtained after the terminal device measures the downlink reference signal and performs higher-layer filtering on a measured value.

Further, in an LTE-V2X system, V2X power control is mainly based on a path loss between the terminal device and a network device, that is, V2X transmission cannot cause interference to uplink transmission. A formula for power control of a physical sidelink shared channel (PSSCH) in LTE-V2X may satisfy the following formula:

$$P_{PSSCH} = 10\log_{10}\left(\frac{M_{PSSCH}}{M_{PSSCH} + 10^{\frac{3}{10}} \times M_{PSCCH}}\right) + \min\{P_{CMAX}, \quad (3)$$
$$10\log_{10}(M_{PSSCH} + 10^{\frac{3}{10}} \times M_{PSCCH}) + P_{O\_PSSCH,3} + \alpha_{PSSCH,3} \times PL\}$$

A formula for power control of a physical sidelink control channel (PSCCH) in the LTE-V2X may satisfy the following formula:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + \min\{P_{CMAX}, \quad (4)$$
$$10\log_{10}(M_{PSSCH} + 10^{\frac{3}{10}} \times M_{PSCCH}) + P_{O\_PSSCH,3} + \alpha_{PSSCH,3} \times PL\}$$

where $P_{PSSCH}$ is a transmit power of the PSSCH, $P_{PSCCH}$ is a transmit power of the PSCCH; $M_{PSSCH}$ is a bandwidth of the PSSCH, $M_{PSCCH}$ is a bandwidth of the PSCCH; $P_{CMAX}$ is a maximum transmit power, or may be understood as a maximum transmit power allowed by the terminal device; PL is a path loss between the terminal device and the base station, and in a communication system, especially in a time division duplexing (TDD) system, it is generally considered that uplink and downlink losses are consistent, so that PL may be used to indicate a possible link loss between the terminal device and a base station side; $P_{O\_PSSCH\_3}$ is a power expected to be received by the terminal device (which may also be understood as a target received power of the terminal device), and 3 indicates scheduling performed by the base station; $\alpha_{PSSCH\_3}$ is a path loss adjustment parameter.

It can be learned from the formula (3) and the formula (4) that the transmit power of the data channel and the transmit power of the control channel are determined based on the path loss between the terminal device and the base station. However, in NR-V2X, only considering the path loss between the terminal device and the base station causes inaccurate power control. Therefore, a path loss between terminal devices further needs to be considered. Generally, in an LTE-V2X communication system, because a service type supported by the LTE-V2X communication system is broadcast transmission, each terminal device may learn of a transmit power of a signal. However, in an NR-V2X communication system, unicast transmission, groupcast transmission, and the like may further be supported. Therefore, when a receive end receives a signal sent by a transmit end, the receive end cannot effectively obtain a transmit power of the signal, and a path loss between the transmit end and the receive end cannot be determined. Therefore, an embodiment of this application provides a power control method, as shown in FIG. 5 and FIG. 6.

Figure 5:
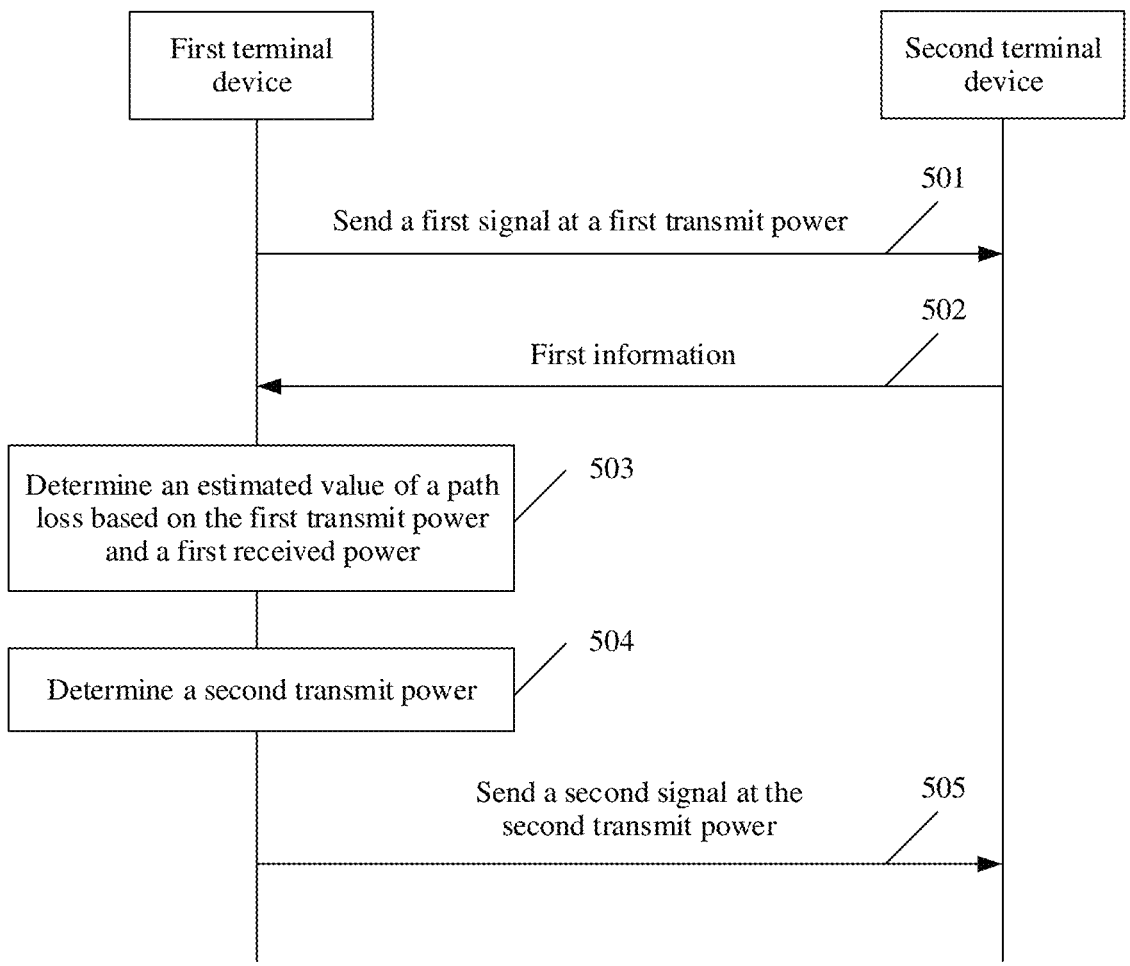
FIG. 5 is a schematic flowchart of a power control method according to an embodiment of this application.
Figure 6:
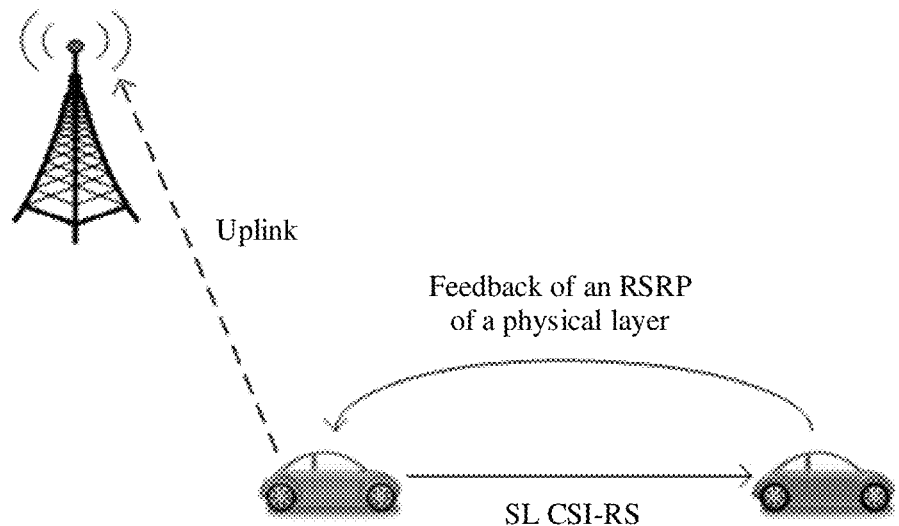
FIG. 6 is a schematic diagram of a scenario of a power control method according to an embodiment of this application.

FIG. 5 is a schematic flowchart of a power control method according to an embodiment of this application. The method may be applied to the communication scenario shown in FIG. 1, and the method may be further applied to the V2V scenario shown in FIG. 2. As shown in FIG. 5, the power control method includes the following steps.

501: A first terminal device sends a first signal to a second terminal device at a first transmit power, and the second terminal device receives the first signal from the first terminal device.

In this embodiment of this application, the first transmit power may be configured by a network device, for example, a base station, or may be determined by the first terminal device. If the first terminal device is within a coverage area of the base station, the first transmit power may be configured by the base station. If the first terminal device is outside a coverage area of the base station, the first transmit power may be determined by the first terminal device. Specifically, the first transmit power may be determined by using a higher layer of the first terminal device, for example, may be determined by using an application layer or a radio resource control (RRC) layer of the first terminal device.

In this embodiment of this application, the first signal may be used to indicate the second terminal device to send first information to the first terminal device. In other words, the first signal may be used to trigger the second terminal device to send the first information to the first terminal device based on a received power of the received first signal. Specifically, the first signal may be understood as a reference signal, that is, the first signal may be understood as a reference signal that can be used by the second terminal device to measure the received power. For example, the first signal may include one or both of a channel state information reference signal (CSI RS) and a synchronization signal block. It may be understood that the CSI RS may be further understood as a CSI RS on a sidelink, and the synchronization signal block may be further understood as an SL synchronization signal block. To be specific, after the first terminal device sends the CSI RS to the second terminal device, the second terminal device may receive the CSI RS, and obtain a measured value of a received power of the CSI RS, for example, obtain a reference signal received power (RSRP). It may be understood that the first signal shown above is merely an example. In a specific implementation or in a future communication system, other signals may exist. Details are not described herein again.

502: The second terminal device sends the first information to the first terminal device, and the first terminal device receives the first information from the second terminal device, where the first information is used to indicate or includes a first received power, and the first received power is the received power of the first signal.

In this embodiment of this application, the first received power may be a received power at which the second terminal device receives the first signal, or the first received power may be a higher-layer filtering power obtained after the second terminal device performs higher-layer filtering based on the received power at which the second terminal device receives the first signal. In other words, the first received power may be directly a received power value measured by the second terminal device, for example, the first received power may be directly an RSRP obtained by the second terminal device based on the received CSI RS. Alternatively, the first received power may be a received power value that is of the higher-layer filtering and that is obtained after the second terminal device performs the higher-layer filtering based on the measured received power value. For example, the first received power may alternatively be a power obtained after the higher-layer filtering is performed based on the obtained RSRP. Therefore, a specific manner of obtaining the first received power is not limited in the embodiments of this application.

In this embodiment of this application, the first information may include the first received power, or the first information may be used to indicate the first received power. For example, when the first information is used to indicate the first received power, in an implementation, the first terminal device and the second terminal device may pre-define a correspondence between a power and information, for example, define a relationship between a power and a bit. Therefore, after the second terminal device determines the first received power, the second terminal device may indicate the first received power to the first terminal device by including a corresponding bit in the first information. If the first received power is 0 dBm, the corresponding bit is 1111; if the first received power is 1 dBm, the corresponding bit is 1110; and so on.

In this embodiment of this application, the first information may be sidelink control information (SCI), sidelink feedback control information (SFCI), or the like. A specific type of the first information is not limited in the embodiments of this application.

503: The first terminal device determines an estimated value of a path loss between the first terminal device and the second terminal device based on the first transmit power and the first received power.

In this embodiment of this application, when the first received power is the received power value measured by the second terminal device, and when receiving the first received power, the first terminal device may further obtain the received power value of the higher-layer filtering by performing the higher-layer filtering. Therefore, the estimated value of the path loss between the first terminal device and the second terminal device is determined based on the received power value of the higher-layer filtering and the first transmit power.

Specifically, the estimated value of the path loss between the first terminal device and the second terminal device may satisfy the following formula:

$$PL_v = \text{TxReferenceSignalPower} - \text{RSRP}_{v,f} \qquad (5)$$

where $PL_v$ is the estimated value of the path loss between the first terminal device and the second terminal device, TxReferenceSignalPower is the first transmit power, and $\text{RSRP}_{v,f}$ is the first received power.

504: The first terminal device determines a second transmit power, where the second transmit power is a transmit power of a second signal.

In this embodiment of this application, the second signal may include a secondary synchronization signal (SSS) and the like. Optionally, the second signal may be further understood as including a data channel, a control channel, a feedback channel, or the like. In other words, after determining the estimated value of the path loss between the first terminal device and the second terminal device, the first terminal device may send one or more of the data channel, the control channel, and the feedback channel to the second terminal device based on the estimated value of the path loss. The control channel may be understood as a channel used to carry SCI, and the SCI may include decoding information, other information, or the like of data transmitted on the data channel. The data channel may be understood as a channel used to carry data. The feedback channel may be understood as a channel used to carry feedback information, and the feedback information may include a hybrid automatic repeat request (HARQ), or the like. Further, the data channel on the sidelink may be a PSSCH, the control channel on the sidelink may be a PSCCH, and the feedback channel on the sidelink may be a physical sidelink feedback channel (PSFCH).

In an embodiment, the first terminal device may determine the second transmit power based on the estimated value of the path loss $PL_V$ between the first terminal device and the second terminal device. For example, the second transmit power may satisfy $P_1=f(PL_1)$, where $f(PL_1)$ is a function, a relationship, or an expression of the estimated value of the path loss $PL_1$ between the first terminal device and the second terminal device. Specifically, the second transmit power may satisfy the following formula:

$$P_1=\min\{P_{CMAX}, f(M)+P_O+\alpha \times PL_1\} \quad (6)$$

where $P_1$ is the second transmit power, $P_{CMAX}$ is a maximum transmit power, $f(M)$ is a function of a bandwidth of the second signal, $P_O$ is a target received power of the second terminal device, and $PL_1$ is the estimated value of the path loss between the first terminal device and the second terminal device. It may be understood that $f(M)$ may be alternatively understood as an expression, a relationship, or the like of the bandwidth of the second signal.

Specifically, the second transmit power may satisfy the following formula:

$$P_1=\min\{P_{CMAX}, 10 \log 10(2^u \times M_{RB})+P_O+\alpha \times PL_v\} \quad (7)$$

where $M_{RB}$ is a quantity of RBs occupied when the first terminal device transmits the second signal, and u may be understood as a parameter corresponding to a subcarrier spacing. For example, when u=0, it indicates that the subcarrier spacing is 15 kHz; when u=1, it indicates that the subcarrier spacing is 30 kHz; when u=2, it indicates that the subcarrier spacing is 60 kHz. Examples are not provided one by one herein.

In this embodiment, transmit powers of the data channel, the control channel, and the feedback channel may all be determined by using the formula (6) or the formula (7). Details are not described herein again.

In an embodiment, the second transmit power may alternatively satisfy the following formula:

$$P_1 \min\{P_{CMAX}, f(M)+P_O+\alpha \times PL_1+f\} \quad (8)$$

where f is an adjustment parameter. Specifically, f may satisfy the following formula:

$$f=\Delta_{TF}+\delta \quad (9)$$

where $\Delta_{TF}$ is a parameter related to a modulation and coding scheme (MCS) of uplink data sent by a terminal device, and $\delta$ is a closed-loop-based power control parameter.

Specifically, the second transmit power may satisfy the following formula:

$$P_1=\min\{P_{CMAX}, 10 \log 10(2^u \times M_{RB})+P_O+\alpha \times PL_V+\Delta_{TF}+\delta\} \quad (10)$$

For descriptions of the parameters, refer to parameter descriptions in the foregoing formulas. Details are not described herein again.

In an embodiment, the first terminal device may alternatively determine a second transmit power based on $PL_V$ and an estimated value of a path loss PL between the first terminal device and the network device. For example, the second transmit power may satisfy $P_1=f(PL_1, PL_2)$, where $f(PL_1,PL_2)$ is a function, a relationship, or an expression of the estimated value of the path loss $PL_1$ between the first terminal device and the second terminal device and the estimated value of the path loss $PL_2$ between the first terminal device and the network device. Specifically, the second transmit power may satisfy the following formula:

$$P_1=\min\{P_{CMAX}, f(M)+P_O+\alpha \times \min(PL_1,PL_2)\} \quad (11)$$

where $PL_2$ is the estimated value of the path loss between the first terminal device and the network device.

Specifically, the second transmit power may satisfy the following formula:

$$P_1=\min\{P_{CMAX}, 10 \log 10(2^u \times M_{RB})+P_O+\alpha \times \min(PL_v, PL)\} \quad (12)$$

In an embodiment, the second transmit power may alternatively satisfy the following formula:

$$P_1=\min\{P_{MAX}, f(M)+P_O+\alpha \times \min(PL_1,PL_2)+f\} \quad (13)$$

Specifically, the second transmit power may satisfy the following formula:

$$P_1=\min\{P_{CMAX}, 10 \log 10(2^u \times M_{RB})+P_O+\alpha \times \min(PL_V, PL)+\Delta_{TF}+\delta\} \quad (14)$$

For specific descriptions of the parameters, refer to the foregoing embodiments. Details are not described herein again.

505: The first terminal device sends the second signal to the second terminal device at the second transmit power, and the second terminal device receives the second signal from the first terminal device.

In this embodiment of this application, the first terminal device obtains, based on the first information sent by the second terminal device, the received power of the first signal received by the second terminal device. Therefore, the first terminal device may determine the estimated value of the path loss between the first terminal device and the second terminal device based on the transmit power and the received power of the first signal, so that the first terminal device can accurately obtain the estimated value of the path loss between the first terminal device and the second terminal device, thereby improving accuracy of power control performed by the first terminal device.

To better understand the method shown in FIG. 5, refer to FIG. 6. FIG. 6 is a schematic diagram of a scenario of a power control method according to an embodiment of this application.

As shown in FIG. 6, in some embodiments of this application, transmitter UE (namely, a first terminal device) may periodically send a reference signal to receiver UE (namely, a second terminal device). The reference signal may include a sidelink channel state information reference signal (SL CSI-RS). The receiver UE measures the received reference signal to obtain an RSRP of a physical layer, and then the receiver UE periodically feeds back the RSRP of the physical layer to the transmitter UE. The transmitter UE performs higher-layer filtering based on the received RSRP of the physical layer to obtain RSRPv,f of the higher-layer filtering. Therefore, the transmitter UE may calculate a path loss (namely, an estimated value of the path loss) between the receiver UE and the transmitter UE according to the formula (5).

After the path loss between the receiver UE and the transmitter UE is calculated, the transmitter UE may perform power control for V2X transmission according to the formula (6) to the formula (14). Details are not described herein again.

It may be understood that, in some embodiments of this application, the transmitter UE periodically sends the reference signal to the receiver UE. After measuring the received reference signal, the receiver UE may further perform the higher-layer filtering based on a measured result, to obtain the reference signal received power RSRPv,f of the higher-layer filtering. Therefore, the receiver UE feeds back RSRPv,f of the higher-layer filtering to the transmitter UE. The transmitter UE obtains the path loss between the transmitter UE and the receiver UE based on RSRPv,f of the higher-layer filtering.

The foregoing is an example shown in this embodiment of this application. In a specific implementation, the reference signal may further include another signal, and the like. This is not limited in the embodiments of this application.

Figure 7:
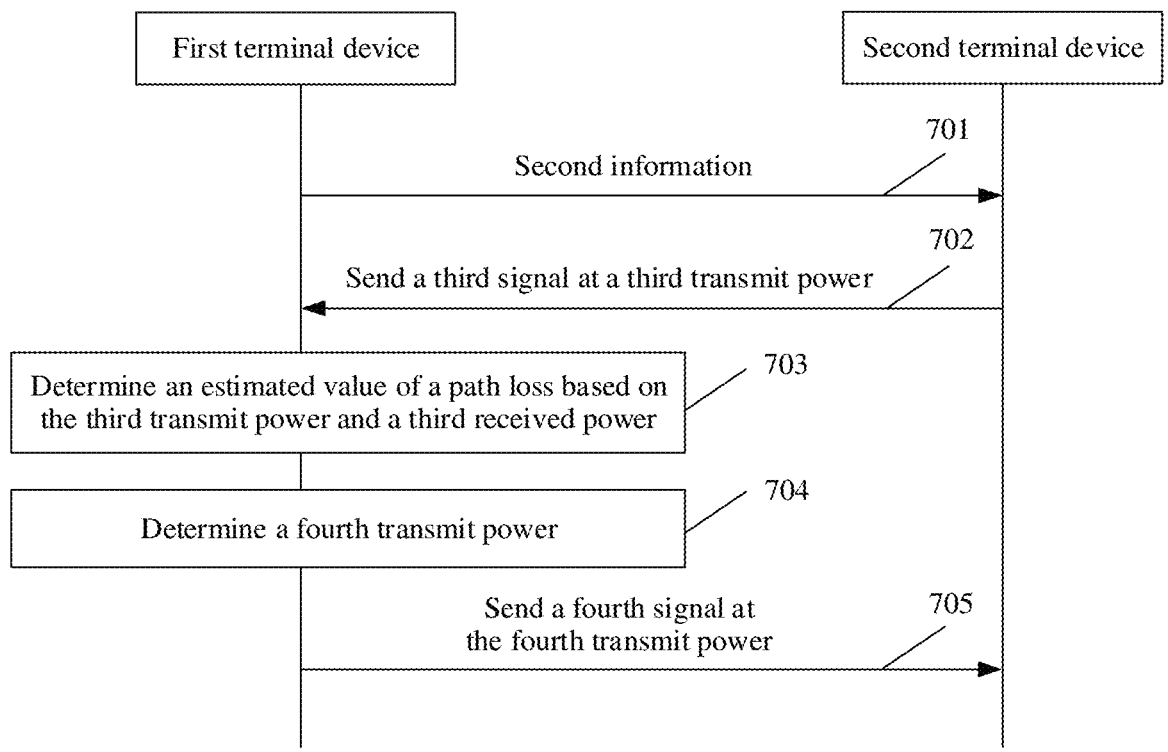
FIG. 7 is another schematic flowchart of a power control method according to an embodiment of this application.

FIG. 7 is another schematic flowchart of a power control method according to an embodiment of this application. The method may be applied to the communication scenario shown in FIG. 1, and the method may be further applied to the V2V scenario shown in FIG. 2. As shown in FIG. 7, the power control method may include the following steps.

701: A first terminal device sends second information to a second terminal device, where the second information is used to indicate or includes a third transmit power; the second terminal device receives the second information from the first terminal device.

In this embodiment of this application, the second information may be used to indicate the second terminal device to send a third signal to the first terminal device at the third transmit power. That is, the second information may be understood as a trigger condition, to trigger the second terminal device to send the third signal to the first terminal device. In this embodiment of this application, the second information may be sidelink control information (SCI), sidelink feedback control information (SFCI), or the like. A specific type of the second information is not limited in the embodiments of this application. It may be understood that for a specific implementation of the second information, refer to descriptions of the first information. Details are not described herein again.

It may be understood that the third transmit power may be configured by a base station, or may be determined by the first terminal device. If the first terminal device is within a coverage area of the base station, the third transmit power may be configured by the base station. If the first terminal device is outside a coverage area of the base station, the third transmit power may be determined by the first terminal device. Specifically, the third transmit power may be determined by using a higher layer of the first terminal device, for example, may be determined by using an application layer or a radio resource control (RRC) layer of the first terminal device.

702: The second terminal device sends the third signal to the first terminal device based on the second information at the third transmit power, and the first terminal device receives the third signal sent by the second terminal device at the third transmit power.

In this embodiment of this application, when the second terminal device receives the second information, the second terminal device sends the third signal to the first terminal device at the third transmit power. The third signal may include one or both of a channel state information reference signal (CSI RS) and a synchronization signal block. It may be understood that the CSI RS may be further understood as a CSI RS on a sidelink (sidelink), and the synchronization signal block may be further understood as an SL synchronization signal block. For a specific implementation of the third signal, refer to a specific implementation of the first signal. Details are not described herein again.

703: The first terminal device determines an estimated value of a path loss between the first terminal device and the second terminal device based on a third received power and the third transmit power, where the third received power is a received power of the third signal.

In this embodiment of this application, after receiving the third signal, the first terminal device may perform higher-layer filtering on a measured received power of the third signal to obtain a received power of the higher-layer filtering, that is, obtain the third received power.

Specifically, the estimated value of the path loss between the first terminal device and the second terminal device may satisfy the following formula:

$$PL_v = SL\text{-ReferenceSignalPower} - RSRP_{v,f} \quad (15)$$

where $PL_V$ is the estimated value of the path loss between the first terminal device and the second terminal device, SL-ReferenceSignalPower is the third transmit power, and $RSRP_{v,f}$ is the third received power.

704: The first terminal device determines a fourth transmit power, where the fourth transmit power is a transmit power of a fourth signal.

In this embodiment of this application, the fourth signal may include a secondary synchronization signal (SSS) and the like. Optionally, the fourth signal may be further understood as including a data channel, a control channel, a feedback channel, or the like. In other words, after determining the estimated value of the path loss between the first terminal device and the second terminal device, the first terminal device may send one or more of the data channel, the control channel, and the feedback channel to the second terminal device based on the estimated value of the path loss. The control channel may be understood as a channel used to carry SCI, and the SCI may include decoding information, other information, or the like of data transmitted on the data channel. The data channel may be understood as a channel used to carry data. The feedback channel may be understood as a channel used to carry feedback information, and the feedback information may include a hybrid automatic repeat request (HARQ), or the like. Further, the data channel on the sidelink may be a PSSCH, the control channel on the sidelink may be a PSCCH, and the feedback channel in the sidelink may be a physical sidelink feedback channel (PSFCH).

In an embodiment, the first terminal device may determine the fourth transmit power based on the estimated value of the path loss $PL_V$ between the first terminal device and the second terminal device. For example, the fourth transmit power may satisfy $P_2=f(PL_1)$, where $f(PL_1)$ is a function, a relationship, or an expression of the estimated value of the path loss $PL_1$ between the first terminal device and the second terminal device. Specifically, the fourth transmit power may satisfy the following formula:

$$P_2=\min\{P_{CMAX}, f(N)+P_O+\alpha \times PL_1\} \qquad (16)$$

where $P_2$ is the fourth transmit power, $P_{CMAX}$ is a maximum transmit power, $f(N)$ is a function of a bandwidth of the fourth signal, $P_O$ is a target received power of the second terminal device, and $PL_1$ is the estimated value of the path loss between the first terminal device and the second terminal device. It may be understood that $f(N)$ may be alternatively understood as an expression, a relationship, or the like of the bandwidth of the fourth signal.

Specifically, the fourth transmit power may satisfy the following formula:

$$P_2=\min\{P_{CMAX}, 10 \log 10(2^u \times N_{RB})+P_O+\alpha \times PL_v\} \qquad (17)$$

where $N_{RB}$ is a quantity of RBs occupied when the first terminal device transmits the fourth signal, and u may be understood as a parameter corresponding to a subcarrier spacing. For example, when u=0, it indicates that the subcarrier spacing is 15 kHz; when u=1, it indicates that the subcarrier spacing is 30 kHz; when u=2, it indicates that the subcarrier spacing is 60 kHz. Examples are not provided one by one herein.

In this embodiment, transmit powers of the data channel, the control channel, and the feedback channel may all be determined by using the formula (16) or the formula (17). Details are not described herein again.

In an embodiment, the fourth transmit power may alternatively satisfy the following formula:

$$P_2=\min\{P_{CMAX}, f(N)+P_O+\alpha \times PL_1+f\} \qquad (18)$$

where f is an adjustment parameter. Specifically, for a formula that f satisfies, refer to the formula (19).

Specifically, the fourth transmit power may satisfy the following formula:

$$P_2=\min\{P_{CMAX}, 10 \log 10(2^u \times N_{RB})+P_O+\alpha \times PL_V+\Delta_{TF}+\delta\} \qquad (19)$$

For descriptions of the parameters, refer to parameter descriptions in the foregoing formulas. Details are not described herein again.

In an embodiment, the first terminal device may alternatively determine a fourth transmit power based on $PL_V$ and an estimated value of a path loss PL between the first terminal device and a network device. For example, the fourth transmit power may satisfy $P_2=f(PL_1,PL_2)$, where $f(PL_1,PL_2)$ is a function, a relationship, or an expression of the estimated value of the path loss $PL_1$ between the first terminal device and the second terminal device and the estimated value of the path loss $PL_2$ between the first terminal device and the network device. Specifically, the fourth transmit power may satisfy the following formula:

$$P_2=\min\{P_{CMAX}, f(N)+P_O+\alpha \times \min(PL_1,PL_2)\} \qquad (20)$$

where $PL_2$ is the estimated value of the path loss between the first terminal device and a network device.

Specifically, the fourth transmit power may satisfy the following formula:

$$P_2=\min\{P_{CMAX}, 10 \log 10(2^u \times N_{RB})+P_O+\alpha \times \min(PL_V, PL)\} \qquad (21)$$

In an embodiment, the fourth transmit power may alternatively satisfy the following formula:

$$P_2=\min\{P_{CMAX}, f(N)+P_O+\alpha \times \min(PL_1,PL_2)+f\} \qquad (22)$$

Specifically, the fourth transmit power may satisfy the following formula:

$$P_2=\min\{P_{CMAX}, 10 \log 10(2^u \times N_{RB})+P_O+\alpha \times \min(PL_V, PL)+\Delta_{TF}+\delta\} \qquad (23)$$

For specific descriptions of the parameters, refer to the foregoing embodiments. Details are not described herein again.

705: The first terminal device sends the fourth signal to the second terminal device at the fourth transmit power, and the second terminal device receives the fourth signal from the first terminal device.

In this embodiment of this application, the second terminal device sends the second information to the first terminal device, so that the first terminal device may determine the estimated value of the path loss between the first terminal device and the second terminal device based on the second information. Therefore, the first terminal device can properly control a transmit power of a signal.

To better understand the method shown in FIG. 7, in some embodiments of this application, for example, transmitter UE may send sidelink control information (SCI) to trigger receiver UE to periodically send an SL reference signal based on a configured transmit power (namely, the third transmit power). The transmitter UE measures the received SL reference signal, and performs higher-layer filtering on a measured result to obtain a reference signal received power RSRPv,f of the higher-layer filtering. Therefore, the transmitter UE calculates a path loss between the transmitter UE and the receiver UE according to the formula (15).

It may be understood that after determining the path loss between the transmitter UE and the receiver UE, the transmitter UE may perform power control for V2X transmission according to the formula (16) to the formula (23).

It may be understood that the foregoing embodiments have different emphasis. For a manner not described in detail in one embodiment, refer to descriptions in other embodiments. Details are not described herein again.

It may be understood that units of formulas in the embodiments shown in this application are not described in detail. For example, a unit of the transmit power of each channel in the foregoing embodiments is dBm.

It may be understood that although some parameter forms are the same in the foregoing embodiments, whether specific values of the same parameter forms in different embodiments are the same is not limited in this application. For example, specific values of $PL_1$ and $PL_2$ in FIG. 5 and FIG. 7 may be determined based on a specific case, and it should not be understood that the values of $PL_1$ (or $PL_2$) in FIG. 5 and FIG. 7 are the same.

It should be noted that, in the embodiments shown in this application, a unit of the bandwidth, for example, a unit of the bandwidth of the second signal and the bandwidth of the fourth signal may be a quantity of resource blocks (RBs). That is, the bandwidth in the foregoing embodiments may be represented by the quantity of RBs.

The foregoing is the methods for performing power control by the terminal device in this application. The following describes in detail power control apparatuses provided in the embodiments of this application. The apparatus may be configured to perform the method described in the embodiments of this application. The apparatus may be a terminal device, a component that is in the terminal device and that implements the foregoing functions, or a chip.

Figure 8:
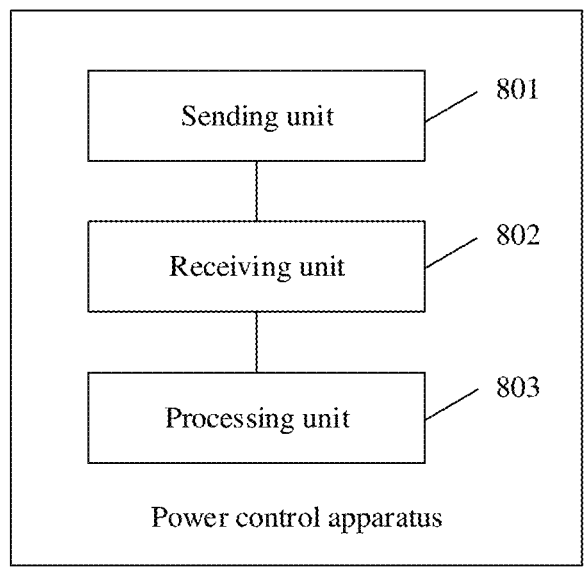
FIG. 8 is a schematic diagram of a structure of a power control apparatus according to an embodiment of this application.

FIG. 8 is a schematic diagram of a structure of a power control apparatus according to an embodiment of this application. The power control apparatus may be configured to perform the method described in the embodiments of this application. As shown in FIG. 8, the power control apparatus includes: a sending unit 8oi, configured to send a first signal to a second terminal device at a first transmit power; a receiving unit 802, configured to receive first information from the second terminal device, where the first information is used to indicate or includes a first received power, and the first received power is a received power of the first signal; and a processing unit 803, configured to determine an estimated value of a path loss between a first terminal device and the second terminal device based on the first transmit power and the first received power.

In a possible implementation, the processing unit 803 is further configured to determine a second transmit power based on the estimated value of the path loss between the first terminal device and the second terminal device, where the second transmit power is a transmit power of a second signal.

The sending unit 801 is further configured to send the second signal to the second terminal device at the second transmit power.

In a possible implementation, the second transmit power satisfies the following formula:

$$P_1=\min\{P_{CMAX}, f(M)+P_O+\alpha \times PL_1\}$$

where $P_1$ is the second transmit power, $P_{CMAX}$ is a maximum transmit power, f(M) is a function of a bandwidth of the second signal, $P_O$ is a target received power of the second terminal device, and $PL_1$ is the estimated value of the path loss between the first terminal device and the second terminal device.

In a possible implementation, the second transmit power satisfies the following formula:

$$P_1=\min\{P_{CMAX}, f(M)+P_O+\alpha \times PL_1+f\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, and f is an adjustment parameter.

In a possible implementation, the processing unit 803 is further configured to determine a second transmit power based on the estimated value of the path loss between the first terminal device and the second terminal device and an estimated value of a path loss between the first terminal device and a network device, where the second transmit power is a transmit power of a second signal.

The sending unit 801 is further configured to send the second signal to the second terminal device at the second transmit power.

In a possible implementation, the second transmit power satisfies the following formula:

$$P_1=\min\{P_{CMAX}, f(M)+P_O+\alpha \times \min(PL_1,PL_2)\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, and $PL_2$ is the estimated value of the path loss between the first terminal device and a network device.

In a possible implementation, the second transmit power satisfies the following formula:

$$P_1=\min\{P_{CMAX}, f(M)+P_O+\alpha \times \min(PL_1,PL_2)+f\}$$

where $P_1$ is the second transmit power, $P_{CMAX}$ is a maximum transmit power, f(M) is a function of a bandwidth of the second signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

In a possible implementation, the first signal includes one or both of a channel state information reference signal CSI RS and a synchronization signal block.

It may be understood that, for a specific implementation of the power control apparatus shown in FIG. 8, refer to descriptions of the method shown in FIG. 5. Details are not described herein again.

It may be understood that the power control apparatus shown in FIG. 8 may be further configured to perform the following steps.

The sending unit 8oi is configured to send second information to the second terminal device, where the second information is used to indicate or includes a third transmit power.

The receiving unit 802 is configured to receive a third signal sent by the second terminal device at the third transmit power.

The processing unit 803 is configured to determine the estimated value of the path loss between the first terminal device and the second terminal device based on a third received power and the third transmit power, where the third received power is a received power of the third signal.

In a possible implementation, the processing unit 803 is further configured to determine a fourth transmit power based on the estimated value of the path loss between the first terminal device and the second terminal device, where the fourth transmit power is a transmit power of a fourth signal.

The sending unit 8oi is further configured to send the fourth signal to the second terminal device at the fourth transmit power.

In a possible implementation, the fourth transmit power satisfies the following formula:

$$P_2=\min\{P_{CMAX}, f(N)+P_O+\alpha \times PL_1\}$$

where $P_2$ is the fourth transmit power, $P_{CMAX}$ is a maximum transmit power, f(N) is a function of a bandwidth of the fourth signal, $P_O$ is a target received power of the second terminal device, and $PL_1$ is the estimated value of the path loss between the first terminal device and the second terminal device.

In a possible implementation, the fourth transmit power satisfies the following formula:

$$P_2=\min\{P_{CMAX}, f(N)+P_O+\alpha \times PL_1+f\}$$

where $P_2$ is the fourth transmit power, $P_{CMAX}$ is a maximum transmit power, f(N) is a function of a bandwidth of the fourth signal, $P_O$ is a target received power of the second terminal device, $PL_1$ is the estimated value of the path loss between the first terminal device and the second terminal device, and f is an adjustment parameter.

In a possible implementation, the processing unit 803 is further configured to determine a fourth transmit power based on the estimated value of the path loss between the first terminal device and the second terminal device and the estimated value of the path loss between the first terminal device and the network device, where the fourth transmit power is a transmit power of a fourth signal.

The sending unit 8oi is further configured to send the fourth signal to the second terminal device at the fourth transmit power.

In a possible implementation, the fourth transmit power satisfies the following formula:

$$P_2 = \min\{P_{CMAX}, f(N) + P_O + \alpha \times \min(PL_1, PL_2)\}$$

where $P_2$ is the fourth transmit power, $P_{CMAX}$ is a maximum transmit power, $f(N)$ is a function of a bandwidth of the fourth signal, $P_O$ is a target received power of the second terminal device, $PL_1$ is the estimated value of the path loss between the first terminal device and the second terminal device, and $PL_2$ is the estimated value of the path loss between the first terminal device and the network device.

In a possible implementation, the fourth transmit power satisfies the following formula:

$$P_2 = \min\{P_{CMAX}, f(N) + P_O + \alpha \times \min(PL_1, PL_2) + f\}$$

where $P_2$ is the fourth transmit power, $P_{CMAX}$ is a maximum transmit power, $f(N)$ is a function of a bandwidth of the fourth signal, $P_O$ is a target received power of the second terminal device, $PL_1$ is the estimated value of the path loss between the first terminal device and the second terminal device, $PL_2$ is the estimated value of the path loss between the first terminal device and the network device, and f is an adjustment parameter.

In a possible implementation, the third signal includes one or both of a channel state information reference signal CSI RS and a synchronization signal block.

It may be understood that, for a specific implementation of the power control apparatus shown in FIG. 8, refer to descriptions of the method shown in FIG. 7. Details are not described herein again.

It should be understood that when the power control apparatus is the terminal device or the component that is in the terminal device and that implements the foregoing functions, the processing unit 803 may be one or more processors, the sending unit 8oi may be a transmitter, and the receiving unit 802 may be a receiver; or the sending unit 8oi and the receiving unit 802 are integrated into one device, for example, a transceiver. When the power control apparatus is the chip, the processing unit 803 may be one or more processors, the sending unit 8oi may be an output interface, and the receiving unit 802 may be an input interface; or the sending unit 8oi and the receiving unit 802 are integrated into one unit, for example, an input/output interface.

Figure 9:
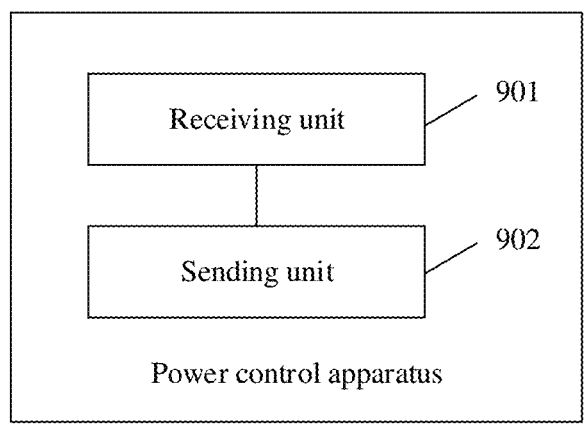
FIG. 9 is another schematic diagram of a structure of a power control apparatus according to an embodiment of this application.

FIG. 9 is another schematic diagram of a structure of a power control apparatus according to an embodiment of this application. As shown in FIG. 9, the power control apparatus may include: a receiving unit 901, configured to receive a first signal from a first terminal device; and a sending unit 902, configured to send first information to the first terminal device, where the first information is used to indicate or includes a first received power, and the first received power is a received power of the first signal.

In a possible implementation, the first signal includes one or both of a channel state information reference signal CSI RS and a synchronization signal block.

It may be understood that the power control apparatus shown in FIG. 9 may be further configured to perform the following steps.

The receiving unit 901 is configured to receive second information from the first terminal device, where the second information is used to indicate or includes a third transmit power.

The sending unit 902 is configured to send a third signal to the first terminal device at the third transmit power.

In a possible implementation, the third signal includes one or both of a channel state information reference signal CSI RS and a synchronization signal block.

It may be understood that, for a specific implementation of the power control apparatus shown in FIG. 9, refer to descriptions of the methods shown in FIG. 5 and FIG. 7. Details are not described herein again.

Figure 10:
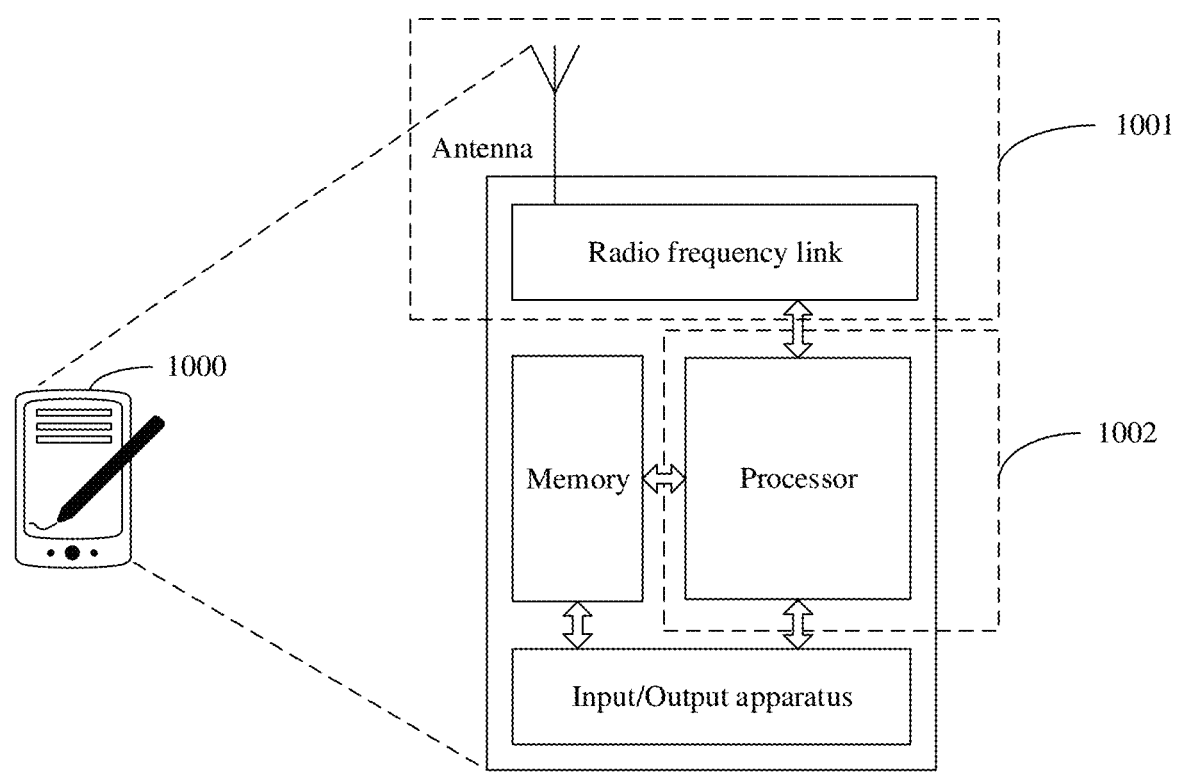
FIG. 10 is a schematic diagram of a structure of a terminal device according to an embodiment of this application.

FIG. 10 is a schematic diagram of a structure of a terminal device 1000 according to an embodiment of this application. The terminal device may perform operations of the first terminal device or the second terminal device in the methods shown in FIG. 5 and FIG. 7, or the terminal device may perform operations of the power control apparatuses shown in FIG. 8 and FIG. 9.

For ease of description, FIG. 10 shows only main components of the terminal device. As shown in FIG. 10, the terminal device 1000 includes a processor, a memory, a radio frequency link, an antenna, and an input/output apparatus. The processor is mainly configured to: process a communication protocol and communication data, control the entire terminal device, execute a software program, and process data of the software program, for example, configured to support the terminal device in performing the procedures described in FIG. 5 and FIG. 7. The memory is mainly configured to store the software program and data. The radio frequency link is mainly configured to: perform conversion between a baseband signal and a radio frequency signal, and process the radio frequency signal. The antenna is mainly configured to send and receive a radio frequency signal in a form of an electromagnetic wave. The terminal device 1000 may further include the input/output apparatus, for example, a touchscreen, a display screen, or a keyboard, and is mainly configured to receive data entered by a user, and output data to the user. It should be noted that some types of terminal devices may have no input/output apparatus.

After the terminal device is powered on, the processor may read a software program in a storage unit, explain and execute instructions of the software program, and process data of the software program. When data needs to be sent in a wireless manner, after performing baseband processing on the to-be-sent data, the processor outputs a baseband signal to the radio frequency link. After performing radio frequency processing on the baseband signal, the radio frequency link sends a radio frequency signal to the outside through the antenna in a form of an electromagnetic wave. When data is sent to the terminal device, the radio frequency link receives a radio frequency signal through the antenna, converts the radio frequency signal into a baseband signal, and outputs the baseband signal to the processor; the processor converts the baseband signal into data, and processes the data.

Persons skilled in the art may understand that for ease of description, FIG. 10 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit (CPU).

The baseband processor is mainly configured to process a communication protocol and communication data. The CPU is mainly configured to: control the entire terminal device, execute a software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may include a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories.

For example, in the embodiments of this application, the antenna and the radio frequency link that have a transceiver function may be considered as a transceiver unit 1001 of the terminal device 1000, and the processor having a processing function may be considered as a processing unit 1002 of the terminal device 1000.

As shown in FIG. 10, the terminal device 1000 includes the transceiver unit 1001 and the processing unit 1002. The transceiver unit may also be referred to as a transceiver machine, a transceiver, a transceiver apparatus, or the like. Optionally, a device that is in the transceiver unit 1001 and that is configured to implement a receiving function may be considered as a receiving unit, and a device that is in the transceiver unit 1001 and that is configured to implement a sending function may be considered as a sending unit. In other words, the transceiver unit 1001 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

In some embodiments, the transceiver unit 1001 and the processing unit 1002 may be integrated into one device, or may be separated as different devices. In addition, the processor and the memory may be integrated into one device, or may be separated as different devices. For example, in an embodiment, the transceiver unit 1001 may be configured to perform the method shown in step 501, step 502, and the like shown in FIG. 5. For another example, in an embodiment, the transceiver unit 1001 may be further configured to perform the method shown in step 701, step 702, and the like shown in FIG. 7.

For another example, in an embodiment, the processing unit 1002 may be configured to control the transceiver unit 1001 to perform the method shown in step 501 and step 502 shown in FIG. 5. The processing unit 1002 may be further configured to control the transceiver unit 1001 to perform the method shown in step 701 and step 702 shown in FIG. 7.

For another example, in an embodiment, the processing unit 1002 may be further configured to perform the method shown in step 503 and step 504 shown in FIG. 5, and the method shown in step 703 and step 704 shown in FIG. 7.

For another example, in an embodiment, the transceiver unit 1001 may be further configured to perform the method performed by the sending unit 801 and the receiving unit 802. For another example, in an embodiment, the processing unit 1002 may be further configured to perform the method performed by the processing unit 803.

It may be understood that for an implementation of the terminal device in this embodiment of this application, refer to the foregoing embodiments. Details are not described herein again.

An embodiment of this application further provides a computer-readable storage medium. All or some of the procedures of the method embodiments may be implemented by a computer program instructing related hardware. The program may be stored in the computer-readable storage medium. When the program is executed, the procedures of the method embodiments may be performed. The computer-readable storage medium may be an internal storage unit of the power control apparatus in any one of the foregoing embodiments, for example, a hard disk or a memory of the power control apparatus. The computer-readable storage medium may alternatively be an external storage device of the power control apparatus, for example, a pluggable hard disk, a smart media card (SMC), a secure digital (SD) card, or a flash card disposed on the power control apparatus. Further, the computer-readable storage medium may alternatively include both an internal storage unit and an external storage device of the foregoing power control apparatus. The computer-readable storage medium is configured to store the foregoing computer program and other programs and data that are required by the foregoing power control apparatus. The computer-readable storage medium may be further configured to temporarily store data that has been output or is to be output.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium, or may be transmitted through the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A sequence of the steps of the method in the embodiments of this application may be adjusted, combined, or deleted based on an actual requirement.

The modules in the apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments, or make equivalent replacements to some technical features thereof, without departing from the scope of the technical solutions of the embodiments of this application.

What is claimed is:

1. A method, performed by a first terminal device or a chip for the first terminal device, the method comprising:
sending a first signal to a second terminal device at a first transmit power;
receiving first information from the second terminal device indicating a first received power, and the first received power being a higher layer filtered reference signal received power (RSRP) determined by the second terminal device based on the first signal;
determining an estimated value of a path loss between the first terminal device and the second terminal device based on the first transmit power and the first received power indicated from the second terminal device;
determining a second transmit power based on a minimize function related to the estimated value of the path loss between the first terminal device and the second terminal device and an estimated value of a path loss between the first terminal device and a network device, wherein the second transmit power is a transmit power of a second signal; and
sending the second signal to the second terminal device at the second transmit power.

2. The method according to claim 1, wherein the first signal comprises one or both of a channel state information reference signal (CSI RS) and a synchronization signal block.

3. The method according to claim 1, further comprising determining, based on the path loss, a transmit power of a data channel associated with the second terminal device and a transmit power of a control channel associated with the second terminal device.

4. The method according to claim 1, wherein the first terminal device is comprised in a vehicle.

5. The method according to claim 1, wherein the first signal is periodically sent to the second terminal device from the first terminal device in response to trigger information.

6. The method according to claim 1, wherein the sending of the first signal triggers the second terminal device to provide at least a portion of the first information to the first terminal device.

7. The method according to claim 1, wherein the first information comprises a bit sequence of a predefined correspondence representing a relationship between the bit sequence and the first received power.

8. A method, performed by a second terminal device or a chip for the second terminal device, the method comprising:
receiving a first signal from a first terminal device; and
sending first information to the first terminal device indicating a first received power, and the first received power is a higher layer filtered reference signal received power (RSRP) determined by the second terminal device based on the first signal, and wherein the first received power is used to determine an estimated value of a path loss; and
receiving a second signal at a second transmit power, the second transmit power based on a minimize function related to the estimated value of the path loss between the first terminal device and the second terminal device and an estimated value of a path loss between the first terminal device and a network device.

9. The method according to claim 8, wherein the first signal comprises one or both of a channel state information reference signal (CSI RS) and a synchronization signal block.

10. The method according to claim 8, wherein the first information comprises a bit sequence of a predefined correspondence representing a relationship between the bit sequence and the first received power.

11. An apparatus comprising:
one or more processors configured to:
send a first signal to a second terminal device at a first transmit power;
receive first information from the second terminal device indicating a first received power and the first received power being a higher layer filtered received power (RSRP) determined by the second terminal device based on the first signal;
determine an estimated value of a path loss between the apparatus and the second terminal device based on the first transmit power and the first received power indicated from the second terminal device;
determine a second transmit power based on a minimize function related to the estimated value of the path loss between the apparatus and the second terminal device and an estimated value of a path loss between the apparatus and a network device, wherein the second transmit power is a transmit power of a second signal; and
send the second signal to the second terminal device at the second transmit power.

12. The apparatus according to claim 11, wherein the first information comprises a bit sequence of a predefined correspondence representing a relationship between the bit sequence and the first received power.

13. An apparatus comprising:
one or more processors configured to:
receive a first signal from a first terminal device; and
send first information to the first terminal device indicating a first received power, and the first received power being a higher layer filtered received power (RSRP) determined by apparatus based on the first signal, wherein the first received power is used to determine an estimated value of a path loss; and
receive a second signal at a second transmit power, the second transmit power based on a minimize function related to the estimated value of the path loss between the first terminal device and the apparatus and an estimated value of a path loss between the first terminal device and a network device.

14. The apparatus according to claim 13, wherein the first information comprises a bit sequence of a predefined correspondence representing a relationship between the bit sequence and the first received power.

* * * * *